United States Patent
Ayukawa

(10) Patent No.: US 10,377,432 B2
(45) Date of Patent: Aug. 13, 2019

(54) VEHICLE LOWER SECTION STRUCTURE

(71) Applicant: TOYOTA JIDOSHA KABUSHIKI KAISHA, Toyota-shi, Aichi-ken (JP)

(72) Inventor: Tatsuya Ayukawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 23 days.

(21) Appl. No.: 15/725,666

(22) Filed: Oct. 5, 2017

(65) Prior Publication Data
US 2018/0148109 A1 May 31, 2018

(30) Foreign Application Priority Data
Nov. 28, 2016 (JP) .................. 2016-230653

(51) Int. Cl.
*B62D 35/02* (2006.01)
*B62D 21/11* (2006.01)
*H02J 7/02* (2016.01)

(52) U.S. Cl.
CPC .............. *B62D 35/02* (2013.01); *B62D 21/11* (2013.01); *H02J 7/025* (2013.01); *Y02T 10/82* (2013.01); *Y02T 10/88* (2013.01)

(58) Field of Classification Search
CPC ..... B62D 35/02; B62D 21/11; Y02T 10/7077; Y02T 10/82; Y02T 10/88; Y02T 10/92; Y02T 90/121; Y02T 90/122; H02J 7/025; H02J 50/00; H02J 50/05; H02J 50/10; H02J 50/12; H02J 50/20; H02J 50/30
See application file for complete search history.

(56) References Cited

U.S. PATENT DOCUMENTS

| | | | | |
|---|---|---|---|---|
| 4,486,046 A | * | 12/1984 | Whitney | B62D 35/001 280/851 |
| 5,390,754 A | * | 2/1995 | Masuyama | B60K 1/04 105/51 |
| 6,202,778 B1 | * | 3/2001 | Mistry | B60R 19/00 180/69.1 |
| 6,435,298 B1 | * | 8/2002 | Mizuno | B62D 35/02 180/346 |
| 7,520,355 B2 | * | 4/2009 | Chaney | B60K 1/04 180/68.5 |

(Continued)

FOREIGN PATENT DOCUMENTS

| | | | | |
|---|---|---|---|---|
| DE | 102008037084 A1 | * | 2/2010 | ............. B62D 35/02 |
| JP | 2003-226260 A | | 8/2003 | |

(Continued)

*Primary Examiner* — Laura Freedman
(74) *Attorney, Agent, or Firm* — Oliff PLC

(57) ABSTRACT

There is provided a vehicle lower section structure including: a suspension member that extends in a vehicle front-rear direction and that includes a pair of side rails that are be separated from each other in a vehicle width direction; a vehicle onboard device that is formed with a substantially box shape, that is disposed between one of the side rails and the other of the side rails, and that includes a bottom face disposed substantially in the same plane as a bottom face of the suspension member; and a flow smoothing section that is provided at at least one of the bottom face of the vehicle onboard device or the bottom face of the suspension member, and that is provided projecting out toward a vehicle lower side and extending along the vehicle front-rear direction.

8 Claims, 5 Drawing Sheets

(56) References Cited

U.S. PATENT DOCUMENTS

| | | | | |
|---|---|---|---|---|
| 7,533,748 B2* | 5/2009 | Miyajima | | H01M 8/247 |
| | | | | 180/68.5 |
| 7,654,351 B2* | 2/2010 | Koike | | B60K 1/04 |
| | | | | 180/68.1 |
| 7,815,250 B2* | 10/2010 | Oshio | | B60K 13/04 |
| | | | | 296/204 |
| 8,366,178 B2* | 2/2013 | Yamagishi | | B62D 35/02 |
| | | | | 296/180.1 |
| 8,882,176 B2* | 11/2014 | Froling | | B62D 35/02 |
| | | | | 296/180.1 |
| 9,758,030 B2* | 9/2017 | Newman | | B60L 11/1879 |
| 9,787,138 B2* | 10/2017 | Ichikawa | | H01F 38/14 |
| 9,826,670 B2* | 11/2017 | Nakamura | | H01F 27/36 |
| 9,926,022 B1* | 3/2018 | Golembeski | | B62D 35/02 |
| 10,065,514 B2* | 9/2018 | Yuasa | | B60L 11/182 |
| 2013/0026797 A1 | 1/2013 | Onodera et al. | | |
| 2014/0145423 A1 | 5/2014 | Isakiewitsch et al. | | |
| 2014/0232331 A1* | 8/2014 | Stamenic | | B60L 11/182 |
| | | | | 320/108 |
| 2016/0236574 A1* | 8/2016 | Asai | | H02J 50/70 |
| 2016/0294222 A1* | 10/2016 | Yuasa | | H02J 7/0027 |
| 2017/0120760 A1* | 5/2017 | Kume | | B60L 11/182 |
| 2017/0232853 A1* | 8/2017 | Lazarev | | B60L 11/1861 |
| | | | | 307/10.1 |
| 2017/0368946 A1* | 12/2017 | Kume | | H02J 50/10 |
| 2018/0025826 A1* | 1/2018 | Nishimura | | B60L 5/00 |
| | | | | 336/199 |
| 2018/0170192 A1* | 6/2018 | Yuasa | | B60K 1/04 |
| 2018/0175350 A1* | 6/2018 | Goitsuka | | B60K 1/04 |
| 2018/0294683 A1* | 10/2018 | Sakamoto | | H02J 50/70 |
| 2018/0370568 A1* | 12/2018 | Ayukawa | | B62D 21/02 |

FOREIGN PATENT DOCUMENTS

| | | | |
|---|---|---|---|
| JP | 2007283810 A | * | 11/2007 |
| JP | 2011-218939 A | | 11/2011 |
| JP | 2012257445 A | * | 12/2012 |
| JP | 2014-000874 A | | 1/2014 |
| JP | 2014-104976 A | | 6/2014 |
| JP | 2015-123791 A | | 7/2015 |
| JP | 2015-186960 A | | 10/2015 |

* cited by examiner

VEHICLE LOWER SECTION STRUCTURE

CROSS-REFERENCE TO RELATED APPLICATION

This application is based on and claims priority under 35 USC 119 from Japanese Patent Application No. 2016-230653 filed on Nov. 28, 2016, the disclosure of which is incorporated by reference herein.

BACKGROUND

Technical Field

The present disclosure relates to a vehicle lower section structure.

Related Art

A suspension member of an automobile is described in Japanese Patent Application Laid-Open (JP-A) No. 2014-104976. This suspension member is configured including a pair of left and right side rails extending in a vehicle front-rear direction, and a cross member coupling the pair of left and right side rails in the vehicle width direction. In the suspension member, a reinforcement structure incorporating a charging module is provided at a vehicle width direction inner side of the pair of left and right side rails.

In the configuration described in JP-A No. 2014-104976, a configuration is described in which a bottom face of the suspension member and a bottom face of the charging module are in the same plane as each other. However, were the airflow flowing at the vehicle lower side of the bottom face of the suspension member and the bottom face of the charging module to be turbulent airflow, there is a possibility that this would reduce the aerodynamic performance such that steering stability could not be improved.

The above related art therefore has room for improvement with regard to this point.

SUMMARY

In consideration of the above circumstances, an object of the present disclosure is to obtain a vehicle lower section structure capable of improving steering stability of the vehicle.

A vehicle lower section structure according to a first aspect of the present disclosure includes a suspension member, a vehicle onboard device, and a flow smoothing section. The suspension member extends in a vehicle front-rear direction and includes a pair of side rails disposed so as to be separated from each other in a vehicle width direction. The vehicle onboard device is formed with a substantially box shape, is disposed between one of the side rails and the other of the side rails, and includes a bottom face disposed substantially in the same plane as a bottom face of the suspension member. The flow smoothing section is provided at at least one of the bottom face of the vehicle onboard device or the bottom face of the suspension member, and is provided projecting out toward a vehicle lower side and extending along the vehicle front-rear direction.

According to the first aspect of the present disclosure, the substantially box shaped vehicle onboard device is provided between the one side rail and the other side rail of the suspension member, and the bottom face of the vehicle onboard device is disposed substantially in the same plane as the bottom face of the suspension member. Further, the flow smoothing section is provided at at least one of the bottom face of the vehicle onboard device or the bottom face of the suspension member, and is provided projecting out toward the vehicle lower side and extending along the vehicle front-rear direction. Thus, airflow along the bottom face of the suspension member and bottom face of the vehicle onboard device, which are substantially in the same plane as each other, flows toward the vehicle rear along the flow smoothing section, enabling airflow to be stabilized and improving the aerodynamic performance of the vehicle.

Here, reference to "substantially in the same plane as" refers not merely to being strictly in the same plane, but also encompasses configurations in which the bottom face of at least one of the suspension member or the vehicle onboard device is curved in the vehicle vertical direction so as not to be in the same flat plane as each other, and configurations in which either bottom face is slightly offset from the other as a result of assembly error or the like.

A vehicle lower section structure according to a second aspect of the present disclosure is the first aspect, wherein the vehicle onboard device is fixed to the suspension member by being fastened to the bottom face of the suspension member from the vehicle lower side.

According to the second aspect of the present disclosure, the vehicle onboard device is fastened to the bottom face of the suspension member from the vehicle lower side, such that the vehicle onboard device can be mounted/unmounted by raising the vehicle and performing a fastening operation from the vehicle lower side. Namely, mounting/unmounting of the vehicle onboard device is easier.

A vehicle lower section structure according to a third aspect of the present disclosure is the first or second aspect, wherein a separation face substantially orthogonal to the vehicle front-rear direction is formed at a vehicle rear end of the flow smoothing section.

According to the third aspect of the present disclosure, a separation face orthogonal to the vehicle front-rear direction is formed at the vehicle rear end of the flow smoothing section. Thus, due to causing a slight separation from the separation face in the airflow flowing toward the vehicle rear along the flow smoothing section, a negative pressure is generated in the vicinity of the separation face. The airflow is attracted toward the vehicle side by the negative pressure, such that airflow flows smoothly toward the vehicle rear along the vehicle. Namely, the smoothing effect on the airflow is increased, enabling the aerodynamic performance of the vehicle to be further improved.

Here, reference to "substantially orthogonal" encompasses not merely configurations in which the separation face is strictly orthogonal to the vehicle front-rear direction, but also configurations in which the angle of the separation face with respect to the vehicle front-rear direction, while not being exactly orthogonal, nevertheless causes the airflow flowing toward the vehicle rear along the flow smoothing section to separate from the separation face.

A vehicle lower section structure according to a fourth aspect of the present disclosure is any one of the first to the third aspect, wherein the vehicle onboard device is a contactless charging module including a contactless charger provided within the contactless charging module, and the contactless charger is disposed at a position separated from the suspension member.

According to the fourth aspect of the present disclosure, the contactless charger provided within the contactless charging module is separated from the suspension member, enabling contact between the contactless charger and the suspension member to be suppressed in cases in which the suspension member shakes due to vibrations input from the road surface.

A vehicle lower section structure according to a fifth aspect of the present disclosure is the present disclosure of any one of the first aspect to the fourth aspect, wherein a pair of the flow smoothing sections are provided on the bottom face of the contactless charger at the vehicle width direction outer sides of positions corresponding to the contactless charging module.

According to the fifth aspect of the present disclosure, a pair of the flow smoothing sections are provided on the bottom face of the contactless charger at the vehicle width direction outer sides of positions corresponding to the contactless charging module. Generally, the distance from the contactless charging module to vehicle width direction end sections of the vehicle is shorter than the distance from the contactless charging module to the vehicle front end section or vehicle rear end section, and so the effect of electromagnetic waves is more likely to be incurred at the vehicle width direction end sections of the vehicle. However, in the present disclosure, electromagnetic waves generated from the contactless charger when charging can be suppressed from being transmitted toward the vehicle width direction outer sides by the pair of flow smoothing sections.

The vehicle lower section structure according to the first aspect of the present disclosure has the excellent advantageous effect of enabling steering stability of the vehicle to be improved.

The vehicle lower section structure according to the second aspect of the present disclosure has the excellent advantageous effect of enabling ease of maintenance of the vehicle onboard device to be improved.

The vehicle lower section structure according to the third aspect of the present disclosure has the excellent advantageous effect of enabling steering stability of the vehicle to be further improved.

The vehicle lower section structure according to the fourth aspect of the present disclosure has the excellent advantageous effect of enabling failure of the contactless charging module to be suppressed.

The vehicle lower section structure according to the fifth aspect of the present disclosure has the excellent advantageous effect of enabling electromagnetic waves to be suppressed from being transmitted to the vehicle exterior.

BRIEF DESCRIPTION OF THE DRAWINGS

Exemplary embodiments of the present disclosure will be described in detail based on the following figures, wherein.

DETAILED DESCRIPTION

Figure 1:
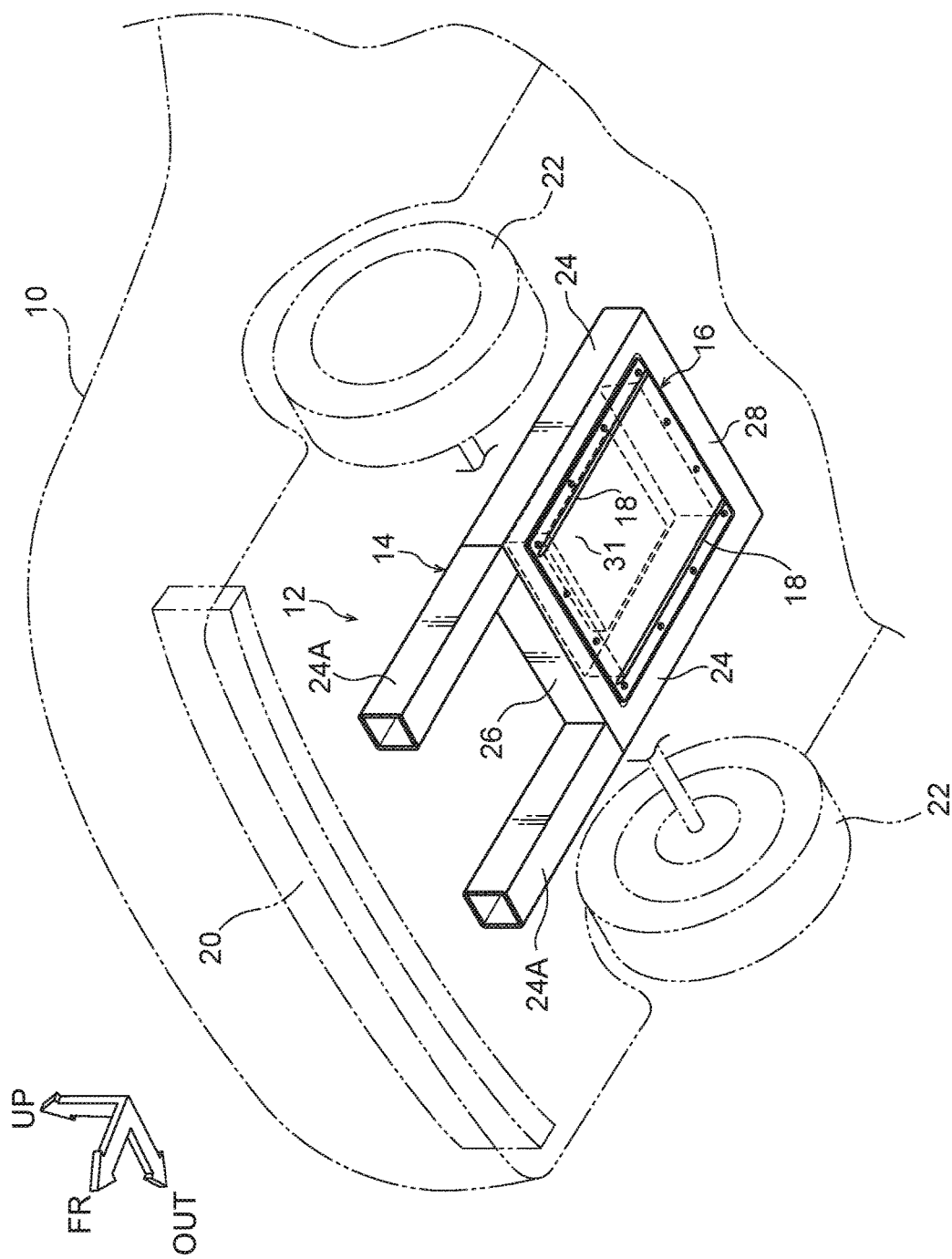
FIG. 1 is a perspective view illustrating a suspension member of a vehicle lower section structure according to an exemplary embodiment, in a state viewed from a vehicle lower side toward a vehicle upper side.

Explanation follows regarding an exemplary embodiment of a vehicle lower section structure according to the present disclosure, with reference to FIGS. 1 to 5. Note that in the drawings, the arrow FR indicates the vehicle front-rear direction front side, the arrow OUT indicates the vehicle width direction outer side, and the arrow UP indicates the vehicle vertical direction upper side.

As illustrated in FIG. 1, a vehicle lower section structure 12 is provided at a vehicle front side and vehicle lower side of a vehicle 10. The vehicle lower section structure 12 is configured including a suspension member 14, a contactless charging module 16 serving as a vehicle onboard device, and flow smoothing sections 18. The suspension member 14 is disposed at the vehicle rear of bumper reinforcement 20 extending in the vehicle width direction and is disposed at a vehicle width direction inner side of a pair of left and right front wheels 22. The front wheels 22 are supported by suspension arms or the like, not illustrated in the drawings, such that the front wheels 22 are capable of being steered.

The suspension member 14 includes a pair of side rails 24 that extend in the vehicle front-rear direction and that are disposed so as to be separated from each other in the vehicle width direction. The suspension member 14 includes a front cross member 26 that couples the pair of left and right pair of side rails 24 together in the vehicle width direction at the vehicle front. The suspension member 14 includes a rear cross member 28 that couples the pair of left and right side rails 24 together in the vehicle width direction at the vehicle rear of the front cross member 26. The pair of side rails 24, the front cross member 26, and the rear cross member 28 are each extrusion molded from a metal member to form a substantially uniform, rectangular closed cross-section profile. Further, the front cross member 26 and the rear cross member 28 are disposed so as to be separated from each other in the vehicle front-rear direction. The suspension member 14 is accordingly formed in a substantially rectangular frame shape, as viewed in vehicle plan view.

A sub side rail 24A is attached to a front end of the pair of respective left and right side rails 24. Each sub side rail 24A is provided extending toward the vehicle front, and is extrusion molded from a metal member to form a substantially uniform, rectangular closed cross-section profile. A front end of each sub side rail 24A is fastened to the front bumper reinforcement 20 through a non-illustrated crash box.

Figure 2:
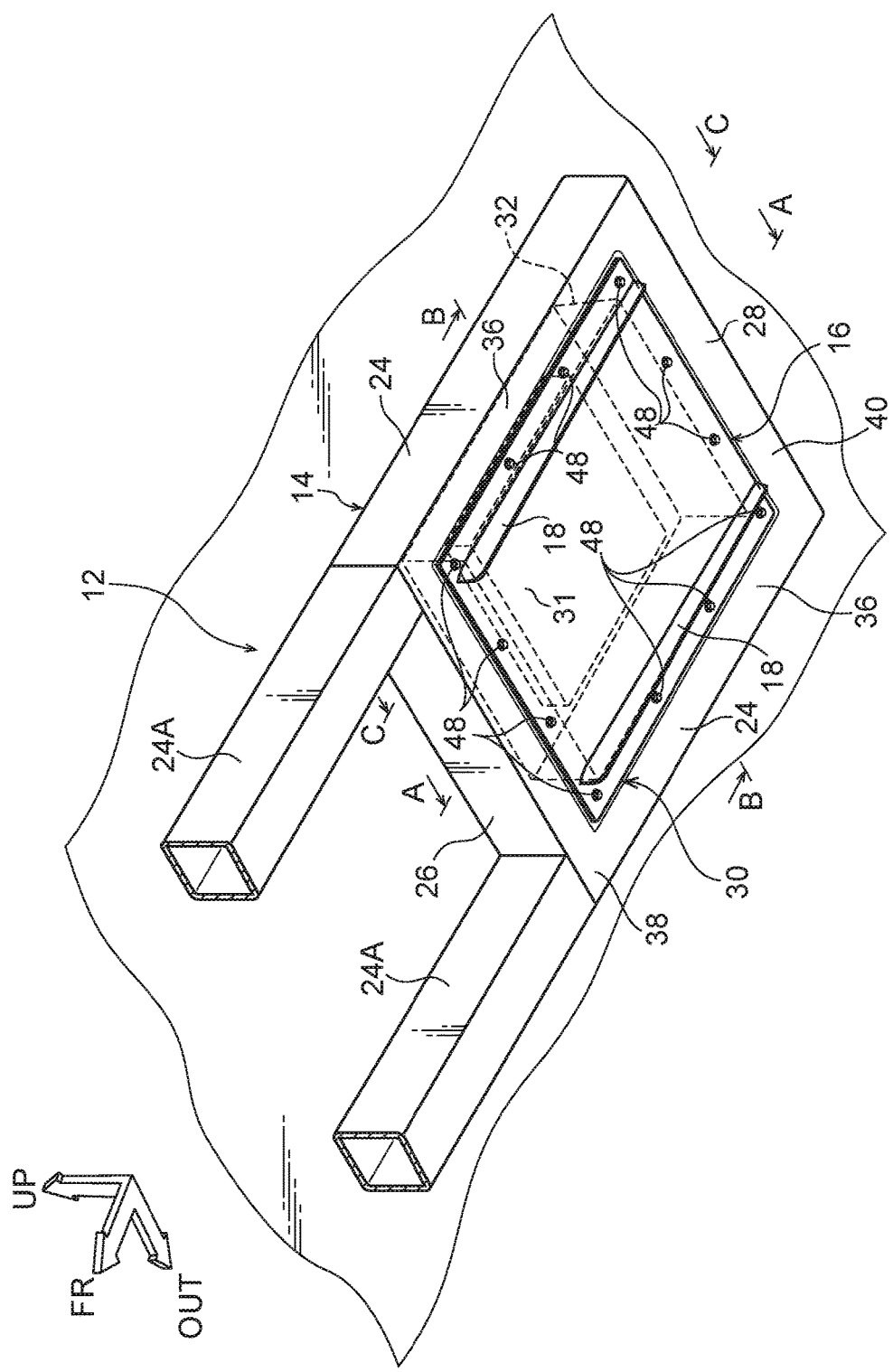
FIG. 2 is a perspective view illustrating an enlargement of relevant portions of the vehicle lower section structure in FIG. 1.

As illustrated in FIG. 2, the contactless charging module 16 is formed with a rectangular shape in vehicle plan view and is disposed inside the frame of the suspension member 14. The contactless charging module 16 is configured including a bottom wall 30, a case 32, and a contactless charger 34. The bottom wall 30 is configured with a rectangular shape in vehicle plan view, and is configured by a resin plate member with its plate thickness direction in the vehicle vertical direction. A bottom face 31 of the bottom wall 30 is set to a size that enables the outer peripheral edges of the bottom face 31 to respectively contact bottom faces 36 of the side rails 24, a bottom face 38 of the front cross member 26, and a bottom face 40 of the rear cross member 28. Plural non-illustrated through holes are provided in the bottom wall 30 so as to be spaced at intervals and penetrate through the plate thickness direction of the bottom wall 30.

Figure 3:
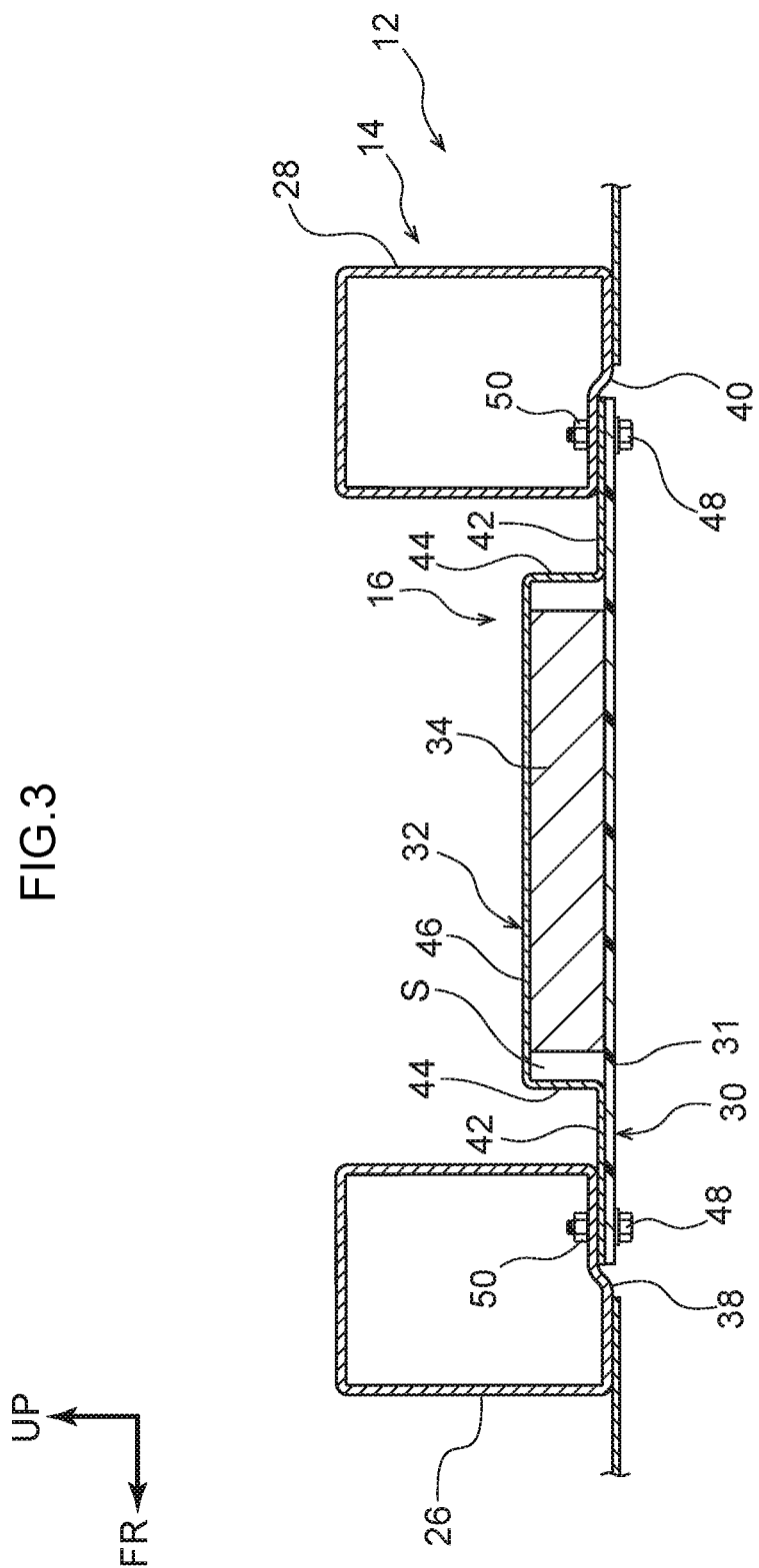
FIG. 3 is an enlarged cross-section of a vehicle lower section structure, illustrating a state section along line A-A in FIG. 2.
Figure 4:
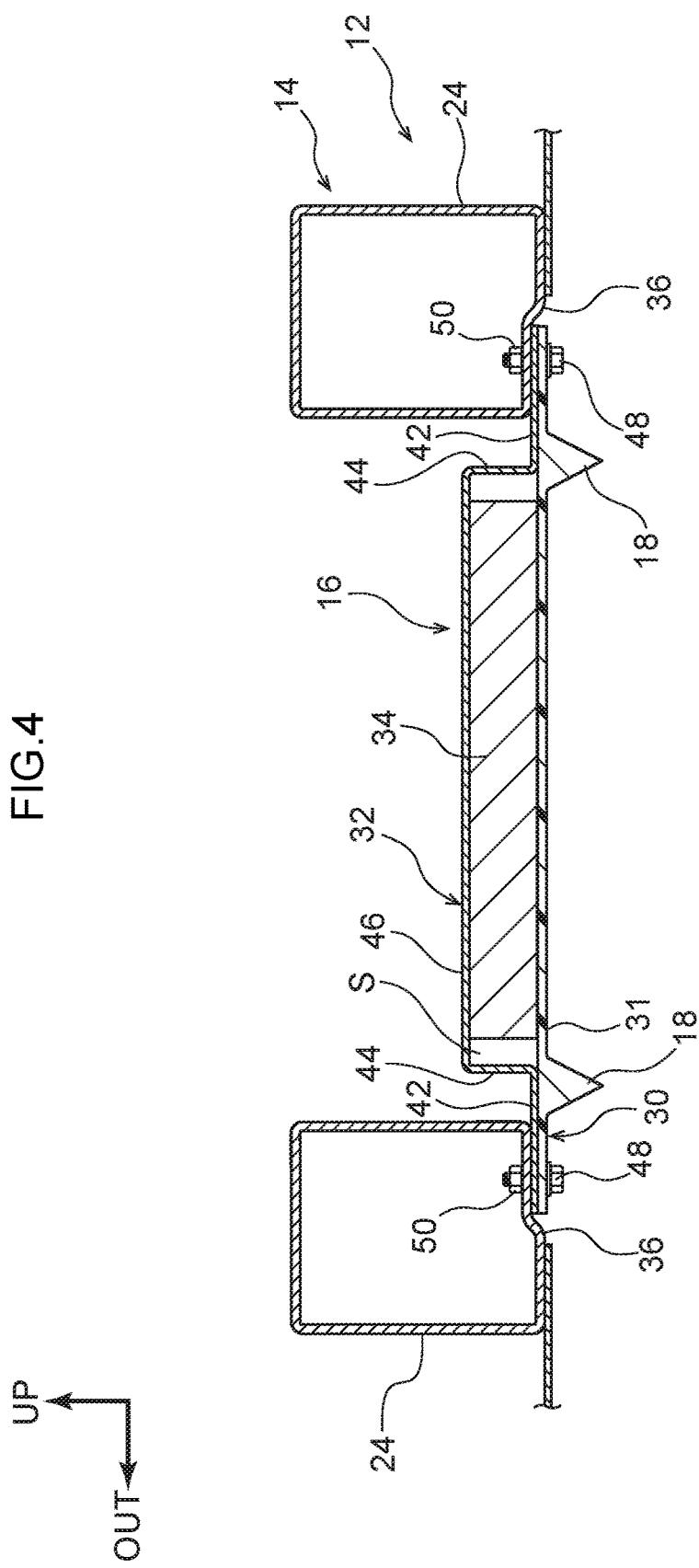
FIG. 4 is an enlarged cross-section of a vehicle lower section structure, illustrating a state section along line B-B in FIG. 2.

The case 32 is formed in a rectangular shape having a size substantially the same as that of the bottom wall 30 in vehicle plan view. As illustrated in FIG. 3 and FIG. 4, the case 32 includes side walls 44 provided extending toward the vehicle upper side of flanges 42 running along the bottom wall 30, and an upper wall 46 that is provided at an upper end of the side walls 44 and extends substantially parallel to the bottom wall 30. A cross-section taken along the vehicle front-rear direction or vehicle width direction of the case 32 is thus configured with a substantially hat shape. Plural non-illustrated through holes are formed in the flanges 42 so as to penetrate through in the plate thickness direction at positions corresponding to the through holes of the bottom wall 30. Bolts 48 are inserted into the through holes of the bottom wall 30 and the through holes of the case 32 from the vehicle lower side. The bottom wall 30, and by extension the contactless charging module 16, is attached to the suspension member 14 by fastening the bolts 48 with nuts 50 provided at positions corresponding to the through holes in the suspension member 14. Further, locations of the bottom faces 36, 38, and 40 of the suspension member 14 that abut the flanges 42 are recessed toward the vehicle upper side by an amount corresponding to the plate thicknesses of the flanges 42 and bottom wall 30. The bottom face 31 of the bottom wall 30 is thereby disposed in the same plane as the bottom faces 36, 38, and 40 of the suspension member 14. Note that the side walls 44 of the case 32 are disposed at positions separated from the suspension member 14 in the vehicle front-rear direction and in the vehicle width direction. The bottom face 31 of the contactless charging module 16 is disposed in the same plane as the bottom faces 36, 38, and 40 of the suspension member 14. However, there is no limitation thereto. Configuration may be made in which a substantially central portion of the bottom face 31 of the contactless charging module 16 in both the vehicle front-rear direction and the vehicle width direction is curved so as to be convex on the vehicle lower side such that the bottom face 31 is not in the same plane as the bottom faces 36, 38, and 40 of the suspension member 14, or configuration may be made in which bottom face 31 is slightly offset in the vehicle vertical direction with respect to the bottom faces 36, 38, and 40 of the suspension member 14.

The contactless charger 34 is disposed inside an internal housing space S formed by the case 32 and the bottom wall 30. The contactless charger 34 is thereby disposed separated from the suspension member 14 in the horizontal direction. The contactless charger 34 is formed with a substantially rectangular box shape and houses a non-illustrated coil unit within. The contactless charger 34 is connected to a battery or the like of the vehicle through a non-illustrated wire harness or the like. The contactless charger 34 is configured such that current due to, for example, an electromagnetic field generated by a non-illustrated power supply unit provided external to the vehicle (for example, on the road surface) flows in the coil unit within the contactless charger 34, thereby supplying power to the battery or the like.

As illustrated in FIG. 4, the flow smoothing sections 18 are provided to the bottom face 31. A pair of the flow smoothing sections 18 are provided on the bottom face 31 at the vehicle width direction outer sides of positions corresponding to the contactless charger 34. A cross-section profile of each of the flow smoothing sections 18 taken orthogonally to the vehicle front-rear has a substantially triangular shape projecting out from the bottom face 31 toward the vehicle lower side, and each flow smoothing section 18 is provided extending along the vehicle front-rear direction. Note that as an example, the flow smoothing sections 18 are integrally formed to the bottom wall 30.

Figure 5:
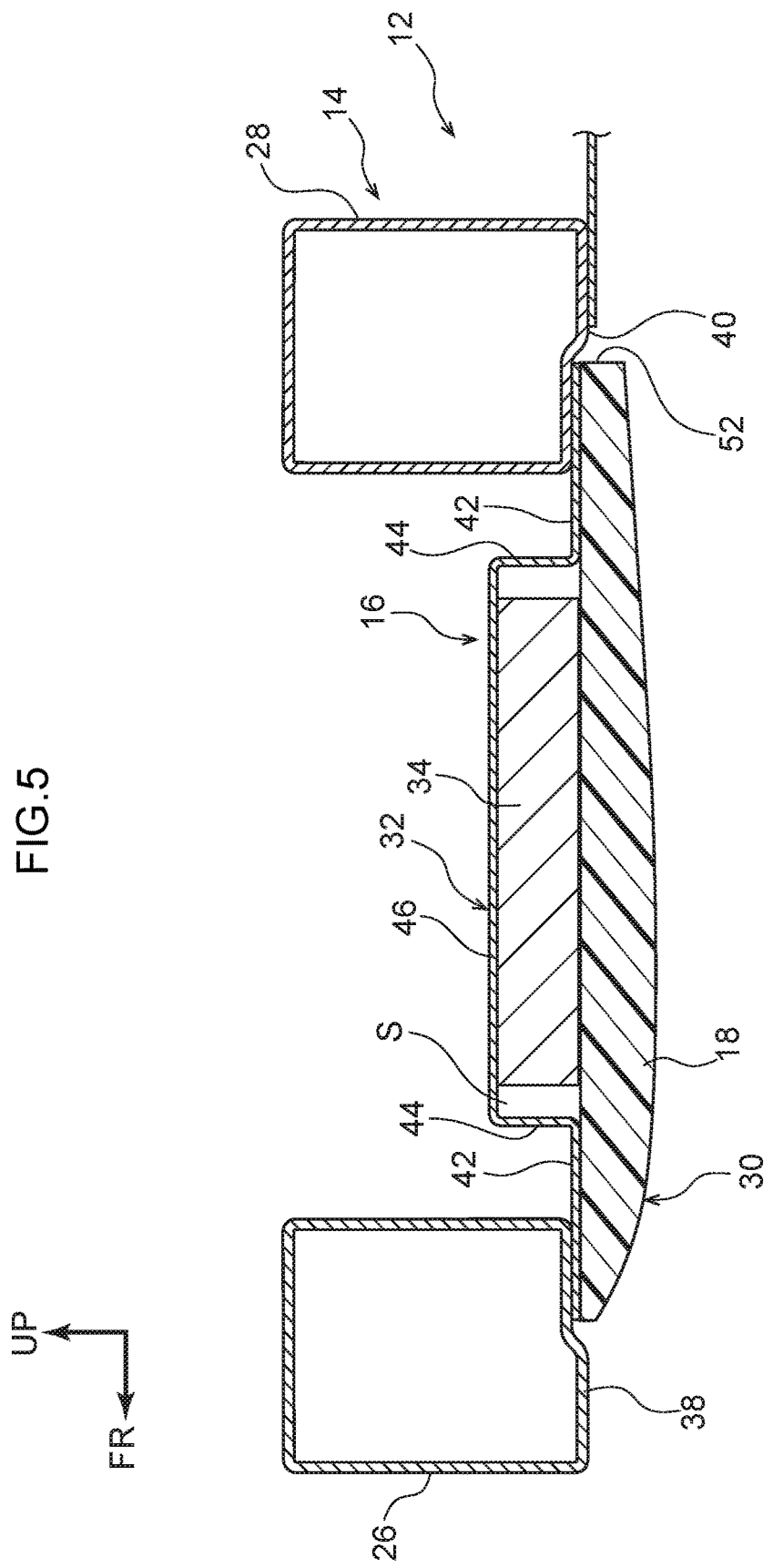
FIG. 5 is an enlarged cross-section of a vehicle lower section structure, illustrating a state section along line C-C in FIG. 2.

As illustrated in FIG. 5, a separation face 52 is formed to respective rear ends of the pair of left and right flow smoothing sections 18. Each separation face 52 is formed so as to be orthogonal to the vehicle front-rear direction.

Operation and Advantageous Effects

Explanation follows regarding operation and advantageous effects of the present exemplary embodiment.

In the present exemplary embodiment, as illustrated in FIG. 3 and FIG. 4, the substantially box shaped contactless charging module 16 is provided between the one side rail 24 and other side rail 24 of the suspension member 14. Namely, the contactless charging module 16 is provided inside a space within the suspension member 14 such that when the vehicle 10 passes over a collision body on the road surface, the collision body is not liable to directly contact the contactless charging module 16 due to the presence of the suspension member 14. This enables protection performance with respect to the contactless charging module 16 to be improved.

The substantially box shaped contactless charging module 16 is provided between the one side rail 24 and other side rail 24 of the suspension member 14 such that the bottom face 31 is disposed substantially in the same plane as the bottom faces 36, 38, and 40 of the suspension member 14. The flow smoothing section 18 is provided projecting out toward the vehicle lower side and extending along the vehicle front-rear direction on at least one of the bottom faces 36, 38, and 40 of the suspension member 14, or the bottom face 31 of the contactless charging module 16. Thus, airflow flowing along the bottom faces 36, 38, and 40 of the suspension member 14 and the bottom face 31 of the contactless charging module 16 that are in substantially in the same plane as each other flows smoothly toward the vehicle rear along the flow smoothing section 18. This enables the airflow to be stabilized, improving the aerodynamic performance of the vehicle. This enables the steering stability of the vehicle 10 to be improved.

Moreover, the bottom face 31 of the contactless charging module 16 is fastened to the bottom faces 36, 38, and 40 of the suspension member 14 from the vehicle lower side. This enables a configuration in which the contactless charging module 16 can be mounted/unmounted by raising the vehicle 10 and performing a fastening or unfastening operation from the vehicle lower side. Namely, mounting/unmounting of the contactless charging module 16 becomes easier. This enables ease of maintenance of the contactless charging module 16 to be improved.

Moreover, as illustrated in FIG. 5, the separation faces 52 orthogonal to the vehicle front-rear direction are formed at the vehicle rear ends of the flow smoothing sections 18. Thus, due to causing a slight separation from the separation faces 52 in the airflow flowing toward the vehicle rear along the flow smoothing section 18, a negative pressure in the vicinity of the separation faces 52 is generated. The airflow is attracted toward the vehicle side by the negative pressure, such that airflow flows smoothly toward the vehicle rear along the vehicle 10. Namely, the smoothing effect on the airflow is increased, enabling the aerodynamic performance of the vehicle 10 to be further improved. This enables steering stability of the vehicle 10 to be further improved. Fuel consumption (electric consumption) can also be improved by the improvement in aerodynamic performance.

The contactless charger 34 provided within the contactless charging module 16 is separated from the suspension member 14. This enables contact between the contactless charger 34 and the suspension member 14 to be suppressed in cases in which the suspension member 14 shakes due to vibrations input from the road surface. This enables failure of the contactless charging module 16 to be suppressed.

The pair of flow smoothing sections 18 are provided on the bottom face 31 of the contactless charging module 16 at the vehicle width direction outer sides of positions corresponding to the contactless charger 34. Generally, the distance from the contactless charging module 16 to vehicle width direction end sections of the vehicle 10 is shorter than the distance from the contactless charging module 16 to the vehicle front end section of the vehicle 10, and so the effect of electromagnetic waves is more likely to be incurred at the vehicle width direction end sections of the vehicle 10. However, in the present exemplary embodiment, electromagnetic waves generated from the contactless charger 34 when charging can be suppressed from being transmitted toward the vehicle width direction outer sides by the pair of flow smoothing sections 18. This enables electromagnetic waves to be suppressed from transmitting to the vehicle exterior.

Note that although in the present exemplary embodiment, the flow smoothing sections 18 are provided to the bottom face 31 of the contactless charging module 16, there is no limitation thereto. Flow smoothing sections provided extending along the vehicle front-rear direction may be provided at at least one of the bottom faces 36 of the side rails 24, the bottom face 38 of the front cross member 26, or the bottom face 40 of the rear cross member 28 of the suspension member 14. The flow smoothing sections may be integrally formed to the bottom faces 36, 38, or 40 of the suspension member 14, or configuration may be made in which flow smoothing sections as separate bodies are attached thereto. Configuration may be made in which plural of the flow smoothing sections are provided side-by-side in the vehicle width direction to at least one of the bottom faces 36, 38, and 40 of the suspension member 14, at positions corresponding to the vehicle front or vehicle rear of the contactless charger 34. Moreover, configuration may be made in which the flow smoothing sections 18 are provided to both the suspension member 14 and the contactless charging module 16. Moreover, a flow smoothing section provided to the suspension member 14 and the flow smoothing section 18 provided to the contactless charging module 16 may be disposed at positions overlapping each other in vehicle front view, or may be disposed at positions that do not overlap in vehicle front view.

Moreover, although configuration is with the contactless charging module 16 attached to the suspension member 14, there is no limitation thereto. A configuration may be adopted in which another vehicle onboard device is attached to the suspension member 14.

Moreover, although the flow smoothing section 18 is integrally formed to the bottom wall 30 of the contactless charging module 16, there is no limitation thereto. The flow smoothing section 18 may be configured by a separate body. The flow smoothing section 18 is not limited to being configured by a resin, and may be configured by another material, such as a metal, to achieve a configuration in which electromagnetic waves are even less liable to be transmitted toward the vehicle width direction outer sides. Similarly to this, configuration may be made in which another shielding member having better electromagnetic wave absorption is attached to the surface of the flow smoothing section 18.

Moreover, although the vehicle lower section structure 12 is configured provided at the vehicle front side and vehicle lower side of the vehicle 10, there is no limitation thereto. The vehicle lower section structure 12 may be configured provided at the vehicle rear side and vehicle lower side of the vehicle 10.

Although the separation face 52 is formed so as to be orthogonal to the vehicle front-rear direction, there is no limitation thereto. The separation face 52 may be configured inclined at an angle other than an angle orthogonal to the vehicle front-rear direction as long as it causes airflow flowing toward the vehicle rear along the flow smoothing section to separate from the separation face. Specifically, the separation face 52 may be set in a range from 45° to 90° with respect to the vehicle front-rear direction. However, from the viewpoint of facilitating separation of the airflow, the separation face is preferably substantially orthogonal to the vehicle front-rear direction.

Explanation has been given above regarding exemplary embodiments of the present disclosure. However, the present disclosure is not limited to the above, and obviously various modifications other than the above may be implemented within a range not departing from the spirit of the present disclosure.

What is claimed is:

1. A vehicle lower section structure comprising:
   a suspension member that extends in a vehicle front-rear direction and that includes a pair of side rails that are separated from each other in a vehicle width direction and that have closed doss-section profiles;
   a vehicle onboard device that is formed with a substantially box shape, that is disposed between one of the side rails and the other of the side rails, and that includes a bottom face disposed substantially in the same plane as a bottom face of the suspension member; and
   a flow smoothing section that is provided at at least one of the bottom face of the vehicle onboard device or the bottom face of the suspension member, and that is provided projecting out toward a vehicle lower side and extending along the vehicle front-rear direction.

2. The vehicle lower section structure of claim 1, wherein the vehicle onboard device is fixed to the suspension member by being fastened to the bottom face of the suspension member from the vehicle lower side.

3. The vehicle lower section structure of claim 1, wherein a separation face substantially orthogonal to the vehicle front-rear direction is formed at a vehicle rear end of the flow smoothing section.

4. The vehicle lower section structure of claim 1, wherein:
   the vehicle onboard device is a contactless charging module including a contactless charger provided within the contactless charging module; and
   the contactless charger is disposed at a position separated from the suspension member.

5. The vehicle lower section structure of claim 4, wherein the flow smoothing section includes a pair of flow smoothing sections provided on the bottom face of the contactless charger at vehicle width direction outer sides of positions corresponding to the contactless charging module.

6. The vehicle lower section structure of claim 4, wherein the flow smoothing section is integrally formed to a bottom wall of the contactless charging module.

7. The vehicle lower section structure of claim 1, wherein the flow smoothing section is configured by a resin.

8. The vehicle lower section structure of claim 1, wherein the flow smoothing section is configured by a metal.

* * * * *